US012727484B2

(12) United States Patent
Chang et al.

(10) Patent No.: US 12,727,484 B2

(45) Date of Patent: Sep. 1, 2026

(54) INTERPOSER WITH CAPACITORS

(71) Applicant: Taiwan Semiconductor Manufacturing Company, Ltd., Hsinchu (TW)

(72) Inventors: Fong-yuan Chang, Hsinchu (TW); Cheng-Hung Yeh, Hsinchu (TW); Hsiang-Ho Chang, Hsinchu (TW); Po-Hsiang Huang, Hsinchu (TW); Chin-Her Chien, Hsinchu (TW); Sheng-Hsiung Chen, Hsinchu (TW); Aftab Alam Khan, Hsinchu (TW); Keh-Jeng Chang, Hsinchu (TW); Chin-Chou Liu, Hsinchu (TW); Yi-Kan Cheng, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 678 days.

(21) Appl. No.: 17/843,746

(22) Filed: Jun. 17, 2022

(65) Prior Publication Data

US 2022/0320018 A1 Oct. 6, 2022

Related U.S. Application Data

(63) Continuation of application No. 16/439,295, filed on Jun. 12, 2019, now Pat. No. 11,367,695.

(Continued)

(51) Int. Cl.

| | |
|---|---|
| ***H10W 44/00*** | (2026.01) |
| ***G06F 30/36*** | (2020.01) |
| ***G06F 111/20*** | (2020.01) |
| ***G06F 119/06*** | (2020.01) |
| ***H10W 70/63*** | (2026.01) |
| ***H10W 70/65*** | (2026.01) |
| ***H10W 70/685*** | (2026.01) |

(Continued)

(52) U.S. Cl.

CPC .......... *H10W 44/601* (2026.01); *G06F 30/36* (2020.01); *H10W 70/635* (2026.01); *H10W 70/65* (2026.01); *H10W 70/685* (2026.01); *H10W 90/00* (2026.01); *G06F 2111/20* (2020.01); *G06F 2119/06* (2020.01); *H10W 70/698* (2026.01); *H10W 72/823* (2026.01); *H10W 90/724* (2026.01)

(58) Field of Classification Search

CPC ......... H01L 23/642; H01L 2924/19041; H01L 23/147; H10W 44/601; H10W 72/00; H10W 70/65; H10W 70/685; H10W 90/00

See application file for complete search history.

(56) References Cited

U.S. PATENT DOCUMENTS 6,100,591 A 8/2000 Ishii
7,768,055 B2 8/2010 Chinthakindi et al.

(Continued)

*Primary Examiner* — Aaron J Gray

(74) *Attorney, Agent, or Firm* — Merchant & Gould P.C.

(57) ABSTRACT

An interposer includes one or more capacitors to store charge to provide signals to an integrated circuit electrically connected to the interposer. First connectors to each capacitor are interspersed with second connectors to the capacitors and are spaced apart from adjacent second connectors. The one or more capacitors and the resistances associated with the conductive paths between each capacitor and a connector or another capacitor can be modeled.

13 Claims, 9 Drawing Sheets

Related U.S. Application Data

(60) Provisional application No. 62/712,725, filed on Jul. 31, 2018.

(51) Int. Cl.

| | |
|---|---|
| ***H10W 70/698*** | (2026.01) |
| ***H10W 72/00*** | (2026.01) |
| ***H10W 90/00*** | (2026.01) |

(56) References Cited

U.S. PATENT DOCUMENTS

| | | | | |
|---|---|---|---|---|
| 10,615,112 | B2 | 4/2020 | Li et al. | |
| 11,367,695 | B2 | 6/2022 | Chang et al. | |
| 2005/0157478 | A1* | 7/2005 | Inagaki | H01G 4/224<br>257/E23.079 |
| 2007/0263364 | A1* | 11/2007 | Kawabe | H05K 1/185<br>257/E23.079 |
| 2010/0181285 | A1 | 7/2010 | Tanaka | |
| 2014/0264742 | A1* | 9/2014 | Yen | H10D 1/042<br>257/532 |
| 2016/0071805 | A1* | 3/2016 | Kuo | H10W 42/20<br>257/659 |
| 2019/0200454 | A1 | 6/2019 | Liu et al. | |

* cited by examiner

INTERPOSER WITH CAPACITORS

CROSS-REFERENCE TO RELATED APPLICATIONS

This application is a continuation of U.S. patent application Ser. No. 16/439,925, filed Jun. 12, 2019, and entitled "Interposer with Capacitors", the disclosure of which is hereby incorporated herein by reference in its entirety, and claims priority to U.S. Provisional Application No. 62/712,725, filed on Jul. 31, 2018, and entitled "Interposer with Capacitors", the disclosure of which is hereby incorporated herein by reference in its entirety.

BACKGROUND

A vertically stacked integrated circuit typically stacks semiconductor dies on top of each other and interconnects the semiconductor dies vertically using, for example, through-silicon vias (TSVs). A vertically stack integrated circuit behaves as a single integrated circuit or device that has a smaller footprint than when the device is constructed with individual integrated circuits.

In some instances, the power used by a circuit on a semiconductor die can vary over time. Additionally or alternatively, a signal supplied by a power supply can experience a loss (e.g., a voltage loss) when received by a circuit on a semiconductor die. The voltage loss may occur based at least in part on the resistance associated with the conductive path a signal travels from the power supply to the circuit.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
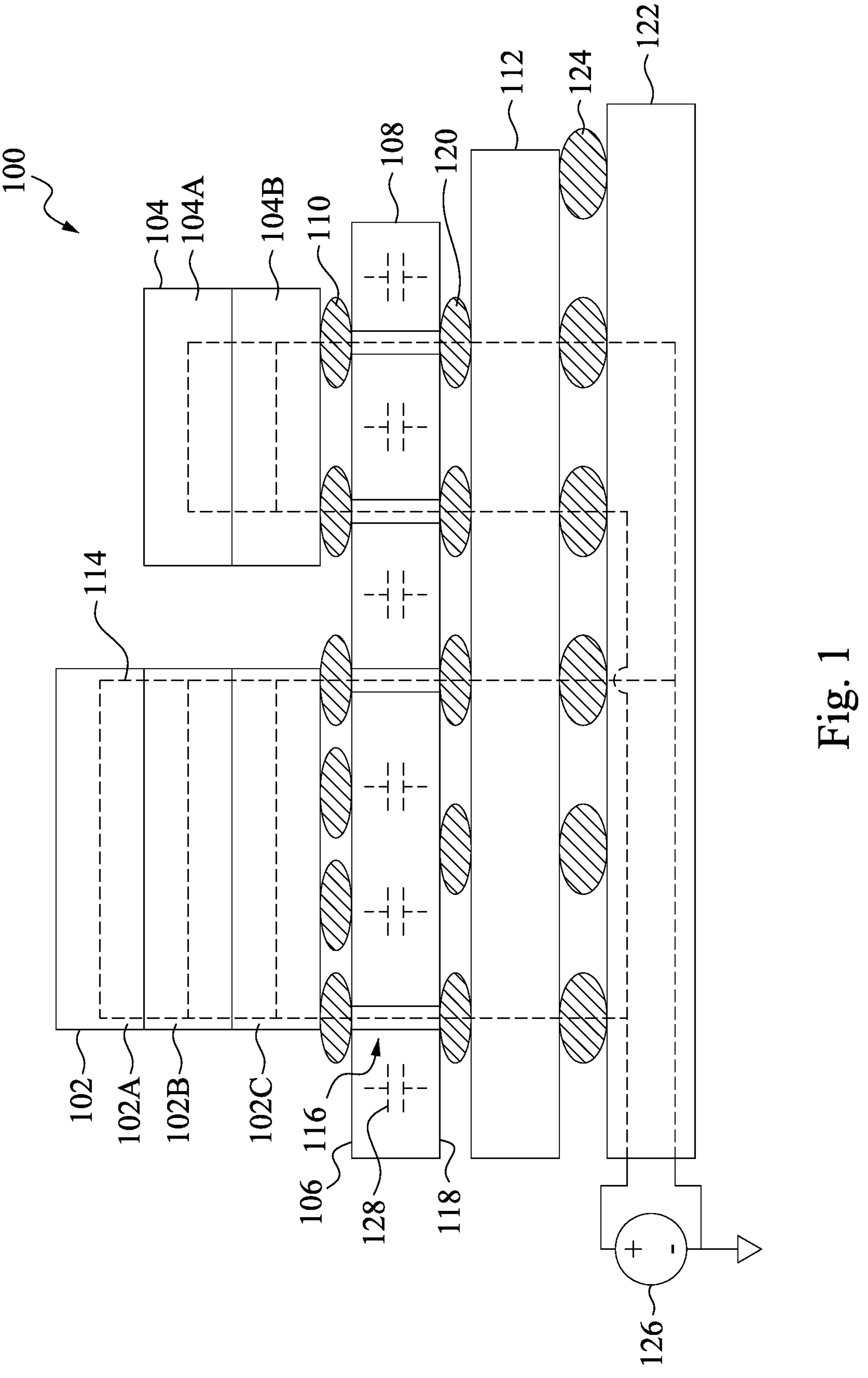
FIG. 1 illustrates an example of an interposer in a vertically stacked integrated circuit in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Embodiments described herein disclose an interposer that can be used to electrically connect a first integrated circuit to a second integrated circuit in a vertically stacked integrated circuit. Additionally or alternatively, the interposer may be used to connect an integrated circuit to a substrate (e.g., a semiconductor substrate or printed circuit board). In some instances, a signal received by a circuit on an integrated circuit can experience signal loss due at least in part to the resistance associated with the conductive path the signal travels from a power supply to the circuit. To reduce the signal loss, the interposer includes one or more capacitors that provide charge or power to one or more circuits on an integrated circuit. Because the distance from a capacitor in the interposer to a circuit is less than the distance from the power supply to the circuit, the resistance associated with the conductive path between the capacitor in the interposer and the circuit is less. Reducing the resistance of the conductive path can in turn reduce the signal loss of a signal that is received by the circuit.

In some embodiments, one or more capacitors and one or more conductive paths in an interposer can be modeled to estimate or determine the electrical behavior or performance of the capacitor(s) and the conductive path(s). By modeling the electrical performance, the capacitors and/or the conductive paths can be designed and fabricated to provide a given power level (or a given range of power) to an integrated circuit and/or to reduce an amount of signal loss in a signal that is received by a circuit in an integrated circuit. Additionally, a performance value of one or more capacitors can be determined. Example performance values include, but are not limited to, an output voltage, an output current, and an amount of charge that can be stored by a capacitor.

FIG. 1 illustrates an example of an interposer in a vertically stacked integrated circuit in accordance with some embodiments. The vertically stacked integrated circuit 100 includes a first integrated circuit 102 and a second integrated circuit 104 that are each stacked on a first surface 106 of an interposer 108 (e.g., a top surface of the interposer). The first and the second integrated circuits 102, 104 are attached and electrically connected to the first surface 106 of the interposer 108 using conductive connectors 110. The conductive connectors 110 can be any type of connectors, such as, for example, solder balls (e.g., a ball grid array, micro-bumps, flip-chip bumps, etc.).

The interposer 108 may electrically connect the first integrated circuit 102 and the second integrated circuit 104 to each other by routing signal lines (not shown) between the first and the second integrated circuits 102, 104. Additionally or alternatively, the interposer 108 can electrically connect the first integrated circuit 102 and/or the second integrated circuit 104 to a semiconductor substrate 112 by routing signal lines 114 in the through-silicon vias 116.

A first surface of the semiconductor substrate 112 (e.g., a top surface of the substrate) is attached and electrically connected to a second surface 118 of the interposer 108 (e.g., a bottom surface of the interposer) using conductive connectors 120. The conductive connecters 120 can be the same as, or different from, the conductive connectors 110.

A second surface (e.g., a bottom surface) of the semiconductor substrate 112 is attached and electrically connected to a surface (e.g., a top surface) of a printed circuit board 122 using conductive connectors 124. The conductive connecters 124 can be the same as, or different from, the conductive connectors 110 or the conductive connectors 120. In some embodiments, the semiconductor substrate 112 may be omitted and the second surface of the interposer 108 is connected to the printed circuit board 122. In other embodiments, the printed circuit board 122 can be omitted.

In the illustrated embodiment, the first integrated circuit 102 is a three-die integrated circuit that includes dies 102A, 102B, 102C, and the second integrated circuit 104 is a two-die integrated circuit that includes dies 104A, 104B. In some instances, a level of a signal (e.g., a voltage level) that is transmitted by the power source 126 and received by at least one of the dies in the integrated circuit 102 and/or the integrate circuit 104 can experience an undesirable amount of signal loss. The signal loss is due at least in part to the resistance of the signal line(s) traveled by the signal.

For example, the voltage level of a signal that is received by die 102A can be less than the voltage level received by die 102C. The resistance of the conductive path that is traveled by the signal can, at least in part, cause the signal loss. In FIG. 1, the conductive path to the die 102A begins at the power supply 126, goes through at least a portion of the printed circuit board 122, through a portion of the substrate 112, through a portion of the interposer 108, and through portions of the dies 102C and 102B. The resistance of that conductive path can adversely affect and reduce the voltage level of the signal.

Additionally or alternatively, the signal level that is used to power one or more circuits in the integrated circuit 102 and/or 104 can vary over time. For example, the integrated circuit 102 can be a high performance integrated circuit and a circuit in the die 102A can use a varying signal level when performing the operations associated with the circuit. When the signal is received at the die 102A from the power supply 126, the signal may not provide a sufficiently varied signal level due to signal loss.

To reduce the amount of signal loss, the interposer 108 includes one or more capacitors 128 that, when an input signal is received by at least one capacitor 128 (e.g., when the power supply 126 is operating), store potential electric energy ("charge") that is used to provide signals to the dies 102A, 102B, 102C and/or 104A, 104B in the first and second integrated circuits 102, 104, respectively. Because the lengths of the conductive paths from the interposer 108 to the dies 102A, 102B, 102C, 104A, 104B are less, the resistances of the conductive paths are less, which in turn may reduce the amount of signal loss. The level of a signal (e.g., voltage level) received by die 102A from one or more capacitors 128 in the interposer 108 can be greater than when the signal is received from the power supply 126.

Figure 2:
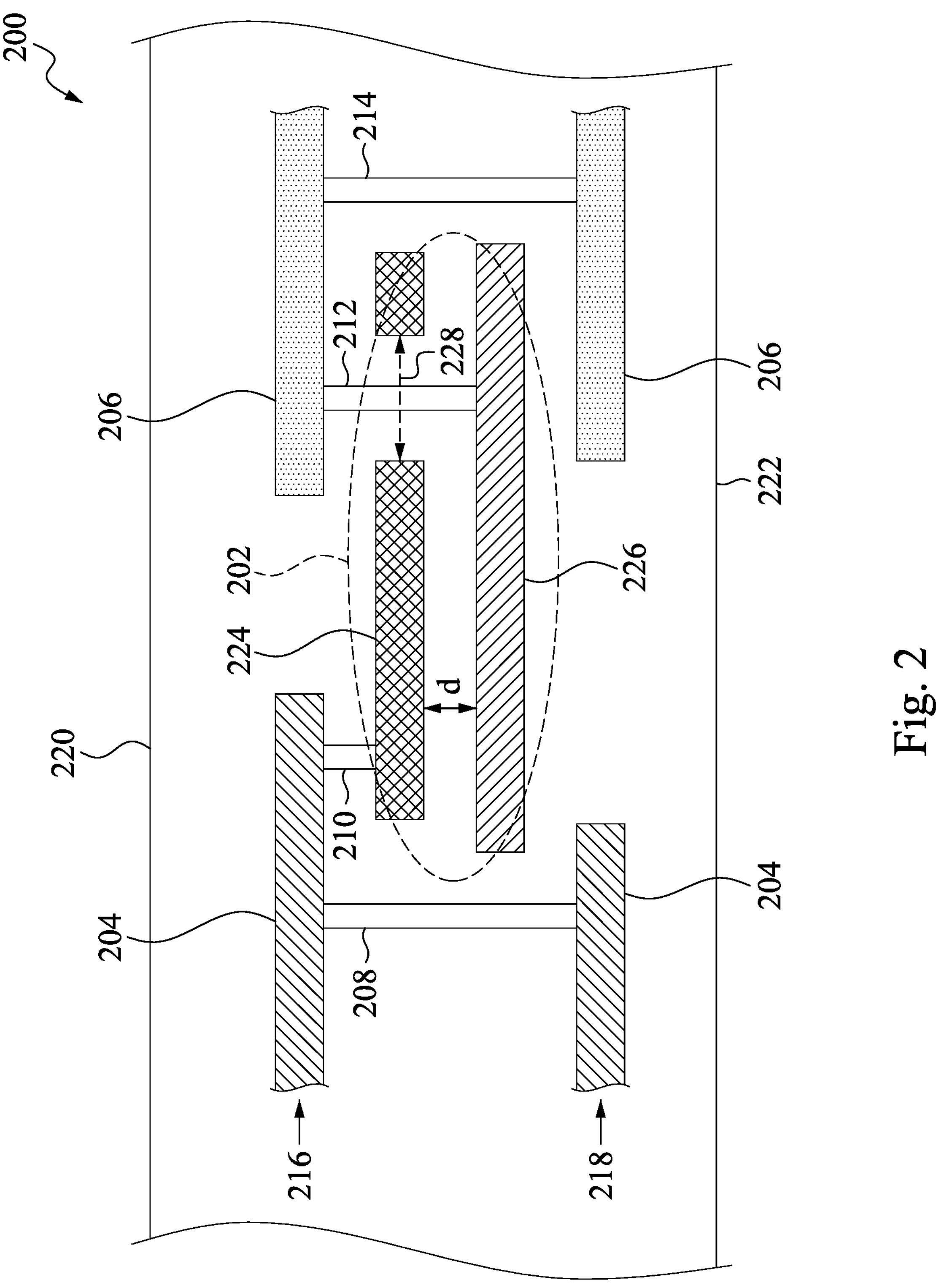
FIG. 2 depicts an example interposer with a capacitor in accordance with some embodiments.

FIG. 2 depicts an example interposer with a capacitor in accordance with some embodiments. The interposer 200 is simplified to show only the capacitor 202, a first signal line 204, a second signal line 206, and connectors 208, 210, 212, 214. In one embodiment, the capacitor 202 is a metal-insulator-metal (MIM) capacitor. The capacitor 202 is formed between a first conductive layer 216 and a second conductive layer 218. In the illustrated embodiment, the first conductive layer 216 is an overlying or top conductive layer that is positioned closer to a top surface 220 of the interposer 200 and the second conductive layer 218 is an underlying or bottom conductive layer that is positioned closer to a bottom surface 222 of the interposer 200. In a non-limiting example, the first and the second conductive layers 216, 218 are metal layers.

The first and the second conductive layers 216, 218 are patterned or formed to provide the first signal line 204 and the second signal line 206. In a non-limiting example, the first signal line 204 is a VDD signal line and the second signal line 206 is a VSS signal line.

The capacitor 202 includes a first conductive plate 224 and a second conductive plate 226. In one non-limiting example, the first conductive plate 224 is a capacitor top metal (CTM) plate and the second conductive plate 226 is a capacitor bottom metal (CBM) plate. Although not shown in FIG. 2, a dielectric layer is disposed between the first and the second conductive plates 224, 226. The capacitance of the capacitor 202 is based in part on the area of the first and the second conductive plates 224, 226 and the distance "d" between the first and the second conductive plates 224, 226.

The first conductive plate 224 is electrically connected to the first signal line 204 using the connector 210. The second conductive plate 226 is electrically connected to the second signal line 206 using the connector 212. The connector 208 electrically connects the first signal line 204 of the first and the second conductive layers 216, 218 together. The connector 214 electrically connects the second signal line 206 of the first and the second conductive layers 216, 218 together.

An opening or via 228 is formed in the first conductive plate 224 to allow the connector 212 to connect the second conductive plate 226 to the second signal line 206. The area of the via 228 causes the area of the first conductive plate 224 to be less than the area of the second conductive plate 226. As will be discussed in more detail later, embodiments of a layout of the connectors 210, 212 can reduce the areas of the vias 228, which in turn increases the effective areas of the capacitors 202. The amount of charge each capacitor can store may increase as a result of the increased effective areas of the capacitors. Additionally or alternatively, an increased number of capacitors can be included in an interposer based on the reduced sizes of the vias 228.

Figure 3:
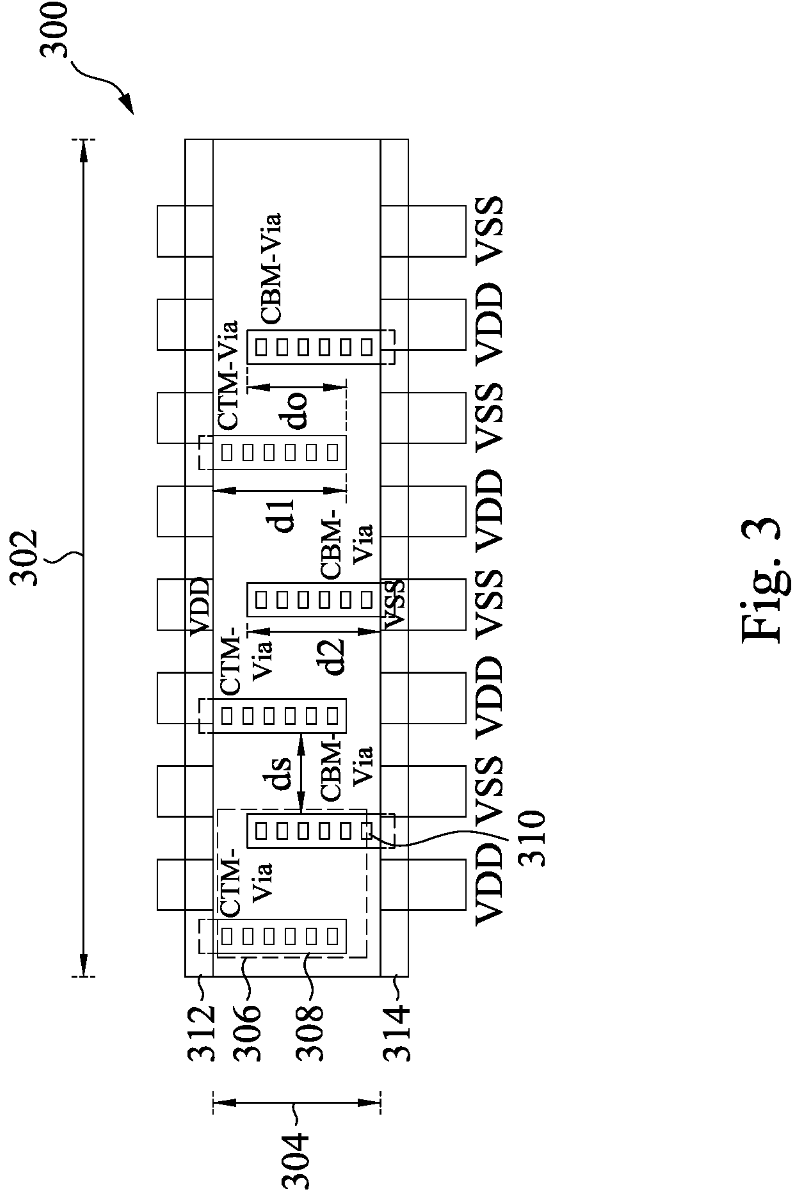
FIG. 3 illustrates a first example layout of connectors in an interposer in accordance with some embodiments.

FIG. 3 illustrates a first example layout of connectors in an interposer in accordance with some embodiments. The interposer 300 includes multiple capacitors distributed throughout the interposer 300. The capacitors are formed in an area having a first dimension 302 (e.g., a length of the area in the interposer in which the capacitors are located), a second dimension 304 (e.g., a width of the area in the interposer in which the capacitors are positioned and/or a width of the area between the first and the second signal lines 312, 314), and a third dimension (not shown) (e.g., a height of the area in the interposer in which the capacitors are located). In some embodiments, the first dimension 302 is greater than the second dimension 304.

An example capacitor is depicted by the dashed box 306. The capacitor 306 stores charge, for example, between the first and the second connectors 308, 310. The first connectors 308 connect the first signal line 312 (e.g., VDD) to the top conductive plates of the capacitors (e.g., the CTM plates). The second connectors 310 connect the second signal line 314 (e.g., VSS) to the bottom conductive plates of the capacitors (e.g., the CBM plates). In the illustrated embodiment, the first and the second connectors 308, 310 have a rectangular shape, although other embodiments are not limited to this configuration.

Along the first dimension 302, one set of connectors (e.g., the second connectors 310) is interspersed between another set of connectors (e.g., the first connectors 308). Interspersing one set of connectors with another set of connectors allows the vias for the connectors to the second conductive plates (e.g., the connector 212 and the via 228 in FIG. 2) to have smaller areas compared to prior connectors.

The first connectors 308 are staggered from the second connectors 310 by a distance ds. The distance ds can be the same for each pair of connectors (e.g., a pair of first and second connectors 308, 310) or the distance ds can differ between pairs of connectors.

Each of the first connectors 308 extend out from the first signal line 312 along the second dimension 304 towards the second signal line 314. The first connectors 308 extend a distance d1 along the second dimension 304, where d1 is less than or equal to the distance of the second dimension 304. Each of the second connectors 310 extend out from the second signal line 314 along the second dimension 304 towards the first signal line 312. The second connectors 310 extend a distance d2 along the second dimension 304, where d2 is less than or equal to the distance of the second dimension 304. The distance d1 can be the same or a different distance than d2. Additionally or alternatively, at least one of the first connectors 308 can extend a distance that is different from d1 (e.g., d1, d1', etc.) and/or at least one of the second connectors 310 can extend a distance that is different from d2 (e.g., d2, d2', etc.).

A portion of a dimension of the first connectors 308 overlaps with a portion of a dimension of the second connectors 310 (and vice versa). For example, in the illustrated embodiment, a portion of a length of the first connectors 308 overlaps a portion of a length of the second connectors 310 and vice versa. The overlapping areas are indicated in FIG. 3 by "d0".

In the illustrated embodiment, each of the first and the second connectors 308, 310 include a set of multiple connectors. For example, in FIG. 3, each of the first and the second connectors 308, 310 include a set of six discrete connectors (represented by the six boxes), although other embodiments are not limited to this number. The multiple connectors in each connector reduce the distances the charge travels to a connector. In other embodiments, the first and/or the second connectors 308, 310 include a set of one or more connectors.

Figure 4:
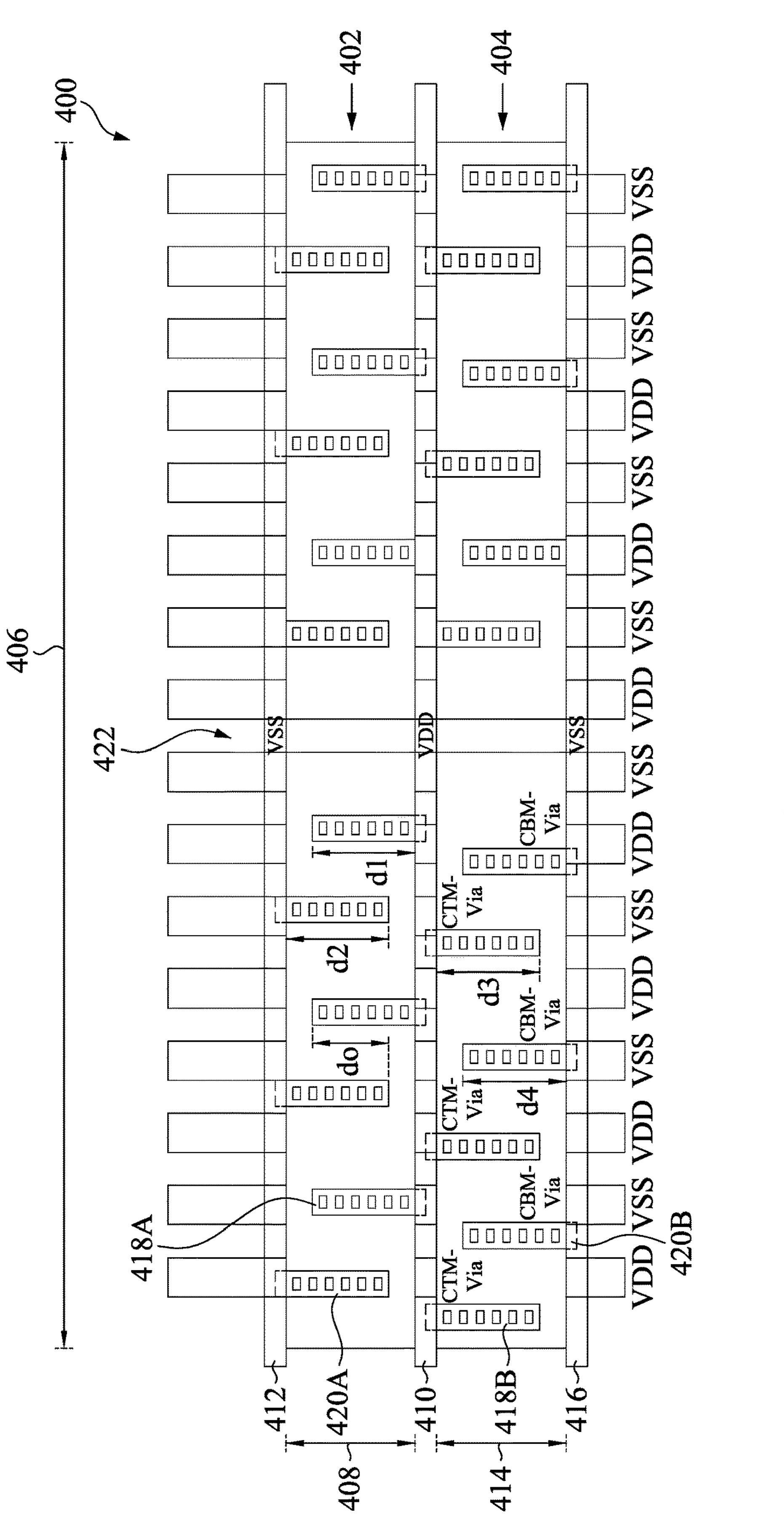
FIG. 4 depicts a second example layout of connectors in an interposer in accordance with some embodiments.

FIG. 4 depicts a second example layout of connectors in an interposer in accordance with some embodiments. In the illustrated embodiment, the second example layout 400 has capacitors positioned in a first area 402 and in a second area 404. The first area 402 includes a first dimension 406 (e.g., a length of the area 402), a second dimension 408 (a distance between a first signal line 410 (e.g., VDD) and a second signal line 412 (e.g., VSS)), and a third dimension (not shown) (e.g., height of area 402). The second area 404 includes the first dimension 406, a third dimension 414 (a distance between the first signal line 412 (e.g., VDD) and a third signal line 416 (e.g., VSS)), and a fourth dimension (not shown) (e.g., a height of the second area 404). In some embodiments, multiple first areas and multiple second areas can alternate sequentially in an interposer. For example, in one embodiment an interposer can include one area (e.g., a first area) adjacent a first side of another area (e.g., a second area) and another first area adjacent a second side of the second area. The other first area can be adjacent a first side of another second area, and so on.

Like FIG. 3, in the first area 402, one set of connectors are interspersed between another set of connectors along the first dimension 406. Each connector is staggered with respect to the adjacent connectors. In the second area 404, one set of connectors are interspersed between another set of connectors along the first dimension 406. Each connector is staggered with respect to the adjacent connectors. For example, in the first area 402, the first connectors 418A connect the first signal line 410 (e.g., VDD) to the top conductive plates of the capacitors (e.g., the CTM plates) and the second connectors 420A connect the second signal line 412 (e.g., VSS) to the bottom conductive plates of the capacitors (e.g., the CBM plates). In the second area 404, the first connectors 418B connect the first signal line 410 (e.g., VDD) to the top conductive plates of the capacitors (e.g., the CTM plates) and the second connectors 420B connect the third signal line 416 (e.g., VSS) to the bottom conductive plates of the capacitors (e.g., the CBM plates). In the illustrated embodiment, the first and the second connectors 418A, 418B, 420A, 420B have a rectangular shape, although other embodiments are not limited to this configuration.

Additionally, in the first area 402 the first connectors 418A and the second connectors 420A are interspersed with each other. The first and the second connectors 418A, 420A are spaced apart and alternate along the first dimension 406. The first connectors 418A extend out from the first signal line 410 along the second dimension 408 towards the second signal line 412 and the second connectors 420A extend out from the second signal line 412 along the second dimension 408 towards the first signal line 410. The first connectors 418A extend a distance d1 along the second dimension 408 and the second connectors 420A extend a distance d2 along the second dimension 408.

A portion of a dimension of the first connectors 418A overlaps with a portion of a dimension of the second connectors 420A (and vice versa). For example, in the illustrated embodiment, a portion of a length of the first connectors 418A overlaps a portion of a length of the second connectors 420A and vice versa. The overlapping areas are indicated in FIG. 4 by "d0".

In the second area 404, the first connectors 418B and the second connectors 420B are interspersed with each other.

The first and the second connectors 418B, 420B are spaced apart and alternate along the first dimension 406. The first connectors 418B extend out from the first signal line 410 along the third dimension 414 towards the third signal line 416 and the second connectors 420B extend out from the third signal line 416 along the third dimension 414 towards the first signal line 410. The first connectors 418B extend a distance d3 along the third dimension 414 and the second connectors 420B extend a distance d4 along the third dimension 414.

Like the first and the second connectors 418A, 420A in the first area 402, a portion of a dimension of the first connectors 418B overlaps with a portion of a dimension of the second connectors 420B (and vice versa). For example, in the illustrated embodiment, a portion of a length of the first connectors 418B overlaps a portion of a length of the second connectors 420B and vice versa.

The distances d1 and d2 are less than or equal to a distance of the second dimension 408, and the distances d3 and d4 are less than or equal to a distance of the third dimension 414. The distances d1, d2, d3, d4 can be the same distances or at least one distance can differ from the other distances. In some aspects, d1 and d3 may be the same distance and d2 and d4 can be the same distance but different distances from d1 and d3. Alternatively, at least one of the first connectors 418A, 418B can extend a distance that is different from d1 and/or d3 and/or at least one of the second connectors 420A, 420B can extend a distance that is different from d2 and/or d4. With the second example layout, a power gate via 422 does not create an open area in the layout.

In some aspects, one or more capacitors and the resistances of one or more conductive paths in an interposer can be modeled. Modeling the capacitors and the resistances provides a better understanding of the storage capability, the power a capacitor can provide to one or more integrated circuits, and other performance values of one or more capacitors. Modeling the capacitors and the resistances can assist in designing the capacitors, such as determining one or more characteristics of the capacitors. The one or more characteristics include, but are not limited, to the area of the top and/or bottom conductive plates and the distance d between the top and bottom conductive plates. The following example embodiments model N capacitors and M conductive paths, where N and M are each equal to or greater than one.

Figure 5:
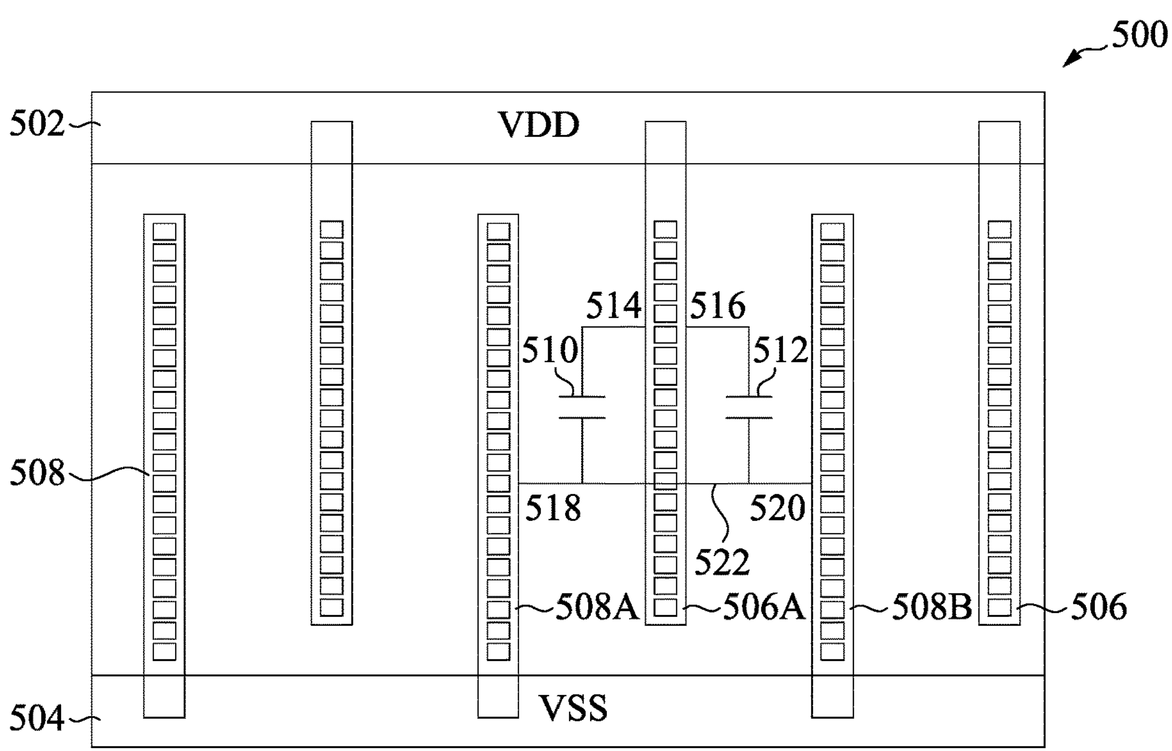
FIG. 5 illustrates a first example of modeling conductive paths and capacitors in an interposer in accordance with some embodiments.

FIG. 5 illustrates a first example of resistive and capacitor modeling in an interposer in accordance with some embodiments. A portion of an interposer 500 is shown in FIG. 5 and includes a first signal line 502 (e.g., VDD) and a second signal line 504 (e.g., VSS). Connected to the first signal line 502 and to the top conductive plates (e.g., the CTM plates) are the first connectors 506. Connected to the second signal line 504 and to the conductive bottom plates (the CBM plates) are the second connectors 508.

In the illustrated embodiment, two capacitors 510, 512 and the resistances associated with five conductive paths 514, 516, 518, 520, and 522 are modeled. The conductive paths 514, 516, 518, 520, 522 represent paths charge can travel from a respective capacitor 510, 512 to a respective connector. The conductive paths 514, 516 extend from the top conductive plates of the capacitors 510, 512, respectively, to the connector 506A. The conductive path 518 extends from the bottom conductive plate of the capacitor 510 to the connector 508A. The conductive path 520 extends from the bottom conductive plate of the capacitor 512 to the connector 508B. The conductive path 522 extends from the bottom conductive plate of the capacitor 510 to the bottom conductive plate of the capacitor 512. The resistances of the conductive paths 514, 516, 518, 520, 522 are based at least in part on the length of each conductive path.

Figure 6:
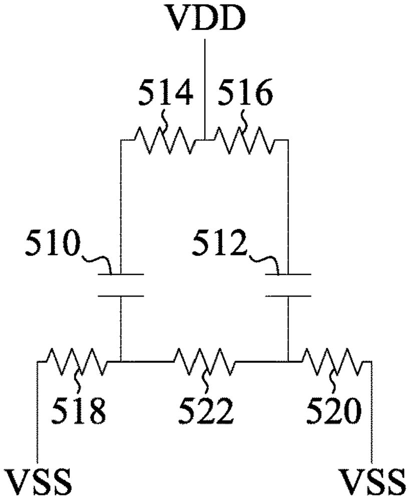
FIG. 6 depicts a schematic diagram of the modeled conductive paths and the capacitors shown in FIG. 5 in accordance with some embodiments.

FIG. 6 depicts a schematic diagram of the modeled conductive paths and the capacitors shown in FIG. 5 in accordance with some embodiments. The capacitors 510, 512 and the resistances of the conductive paths 514, 516, 518, 520, 522 are represented in the schematic diagram. The electrical performances of each capacitor 510, 512 and associated conductive paths 514, 516, 518, 520, 522 can be estimated or determined based on the modeling of the components. Modeling the electrical behaviors or performances of the components can assist in determining a characteristic or characteristics of the capacitors 510, 512. For example, the modeled electrical performance can be used to determine the sizes of the capacitors 510, 512 (e.g., the areas of the top and bottom conductive plates and the distance between the top and bottom conductive plates).

Figure 7:
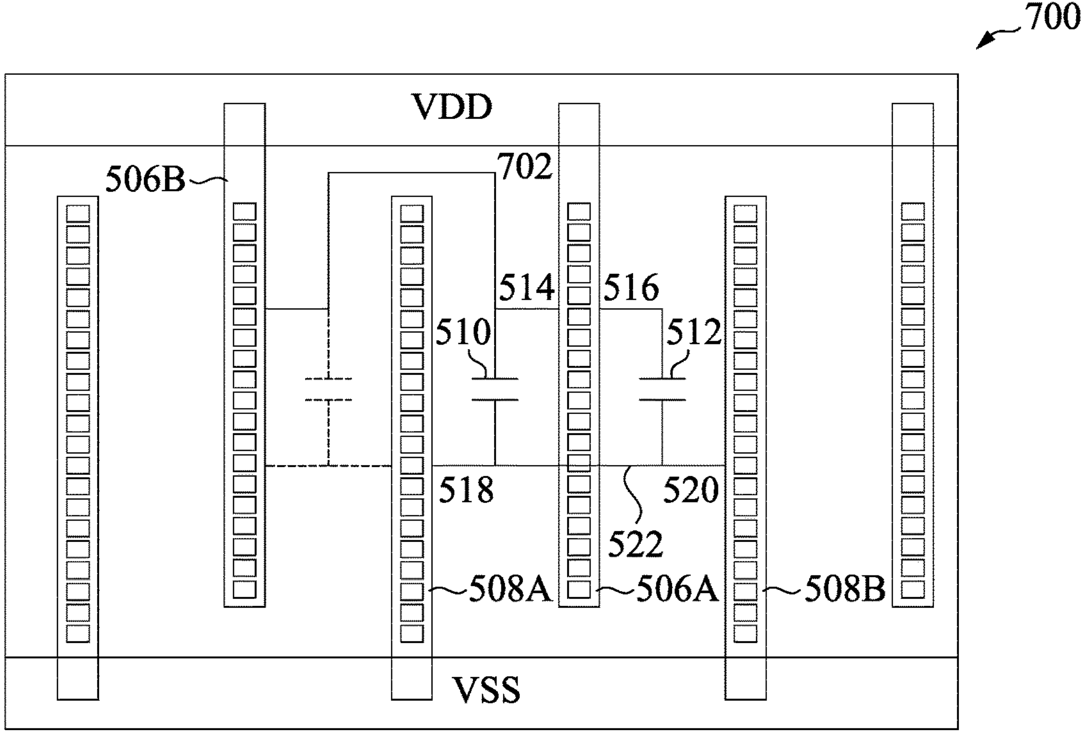
FIG. 7 illustrates a second example of modeling conductive paths and capacitors in an interposer in accordance with some embodiments.

FIG. 7 illustrates a second example of resistive and capacitor modeling in an interposer in accordance with some embodiments. FIG. 7 includes the capacitors 510, 512 and the conductive paths 514, 516, 518, 520, 522 shown in FIG. 5 along with an additional conductive path 702. The conductive path 702 represents a path charge can travel from the capacitor 510 to the connector 506B.

Figure 8:
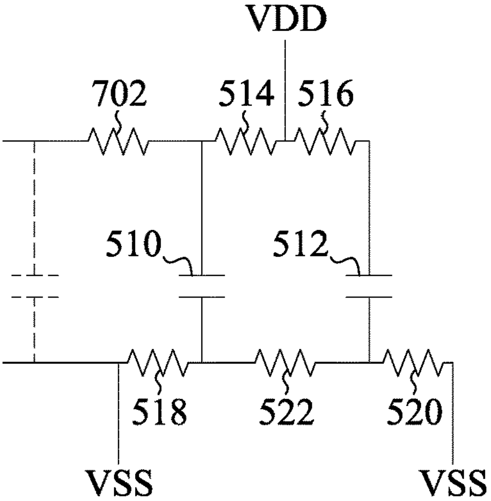
FIG. 8 depicts a schematic diagram of the modeled conductive paths and the capacitors shown in FIG. 7 in accordance with some embodiments.

FIG. 8 depicts a schematic diagram of the modeled conductive paths and the capacitors shown in FIG. 7 in accordance with some embodiments. The capacitors 510, 512 and the resistances of the conductive paths 514, 516, 518, 520, 522, 702 are represented in the schematic diagram. The electrical performances of each capacitor 510, 512 and associated conductive paths 514, 516, 518, 520, 522, 702 can be estimated or determined based on the modeling of the components. Modeling the electrical behaviors or performances of the components can assist in determining one or more characteristics of the capacitors. The characteristic(s) include, for example, the sizes of the capacitors 510, 512 (e.g., the areas of the top and bottom conductive plates and the distance between the top and bottom conductive plates).

Figure 9:
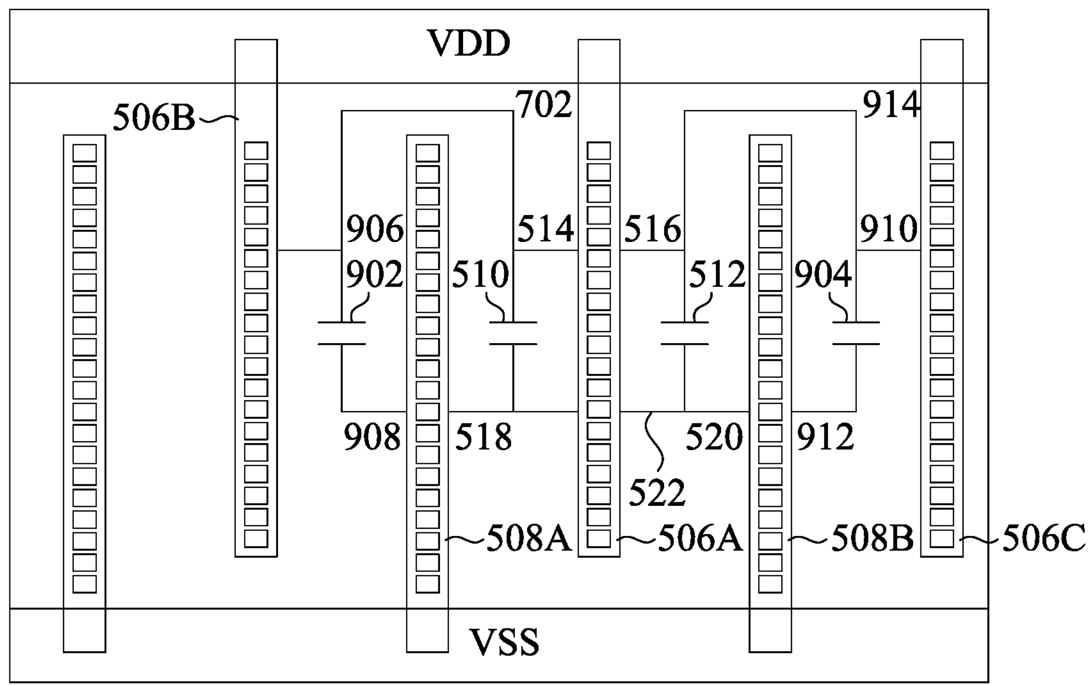
FIG. 9 illustrates a third example of modeling conductive paths and capacitors in an interposer in accordance with some embodiments.

FIG. 9 illustrates a third example of resistive and capacitor modeling in an interposer in accordance with some embodiments. FIG. 9 includes the capacitors 510, 512 and the conductive paths 514, 516, 518, 520, 522, 702 shown in FIG. 7 along with additional capacitors 902, 904 and additional conductive paths 906, 908, 910, 912, 914. The conductive path 906 represents a path charge can travel from the capacitor 902 to the connector 506B. The conductive path 908 represents a path charge can travel from the capacitor 902 to the connector 508A. The conductive path 910 represents a path charge can travel from the capacitor 904 to the connector 506C. The conductive path 912 represents a path charge can travel from the capacitor 904 to the connector 508B. The conductive path 914 represents a path charge can travel from the capacitor 512 to the connector 506C.

Figure 10:
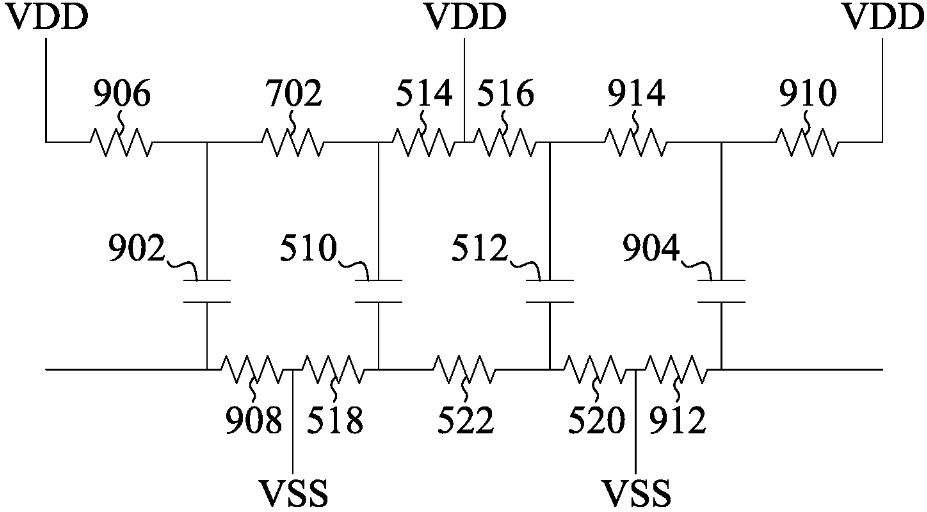
FIG. 10 depicts a schematic diagram of the modeled conductive paths and the capacitors shown in FIG. 9 in accordance with some embodiments.

FIG. 10 depicts a schematic diagram of the modeled conductive paths and the capacitors shown in FIG. 9 in accordance with some embodiments. The capacitors 510, 512, 902, 904 and the resistances of the conductive paths 514, 516, 518, 520, 522, 702, 906, 908, 910, 912, 914 are represented in the schematic diagram. The electrical performances of each capacitor 510, 512, 902, 904 and associated conductive paths 514, 516, 518, 520, 522, 702, 906, 908, 910, 912, 914 can be estimated or determined based on the modeling of the components.

Figure 11:
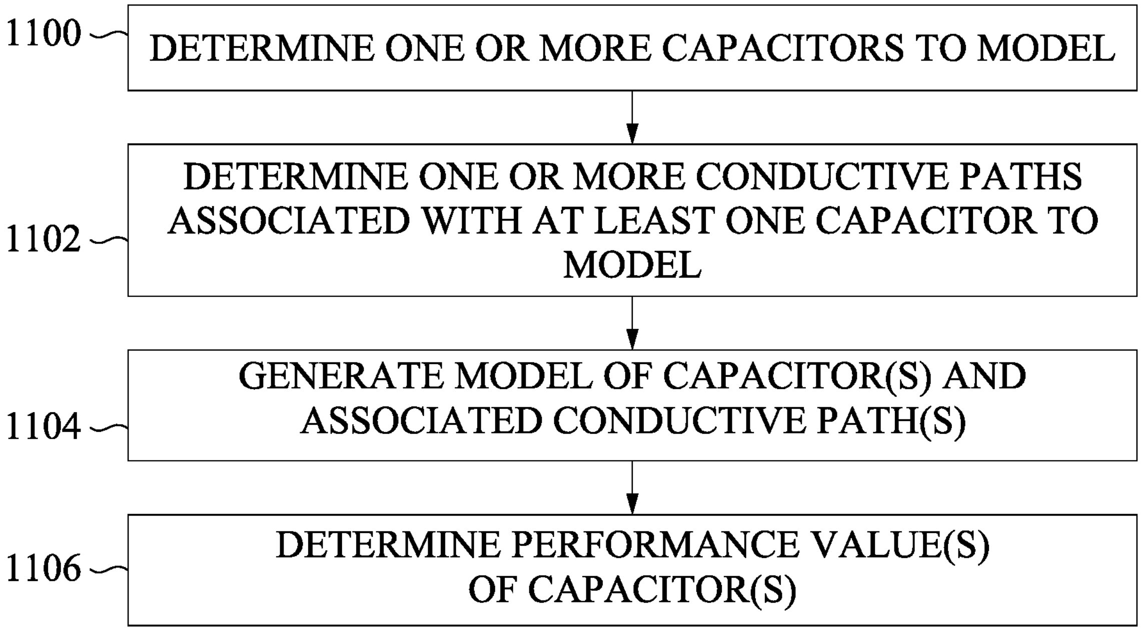
FIG. 11 is a flowchart of an example method for modeling conductive paths and capacitors in an interposer in accordance with some embodiments.

Any number of capacitors and conductive paths in an interposer can be modeled. FIG. 11 is a flowchart of an example method for modeling conductive paths and capacitors in an interposer in accordance with some embodiments. Initially, as shown in block 1100, one or more capacitors in an interposer that will be modeled are determined. Next, as shown in block 1100, one or more conductive paths associated with at least one of the capacitors determined in block 1102 is determined. Each conductive path can be a path between a capacitor and a connector (e.g., conductive path 514) or a capacitor and another capacitor (e.g., conductive path 522).

After the capacitor(s) and conductive path(s) are determined, a model of the capacitor(s) and the resistances associated with the conductive path(s) is generated (block 1104). As described earlier, the electrical performance of each capacitor and at one or more conductive path that are associated with at least one capacitor can be estimated or determined based on the model. Modeling the capacitors and the resistances associated with the conductive paths also permits one or more performance values of a capacitor to be determined (block 1106). Example performance values include, but are not limited to, an output voltage, an output current, and an amount of charge that can be stored by a capacitor. Based on the modeled performances, a layout of the capacitors and/or the design of the capacitors may be adjusted to increase one or more performance values. For example, the area of the CTM and/or CBM plates may be changed and/or one or more of the distances d0, d1, d2, d3, d4 may be modified.

Figure 12:
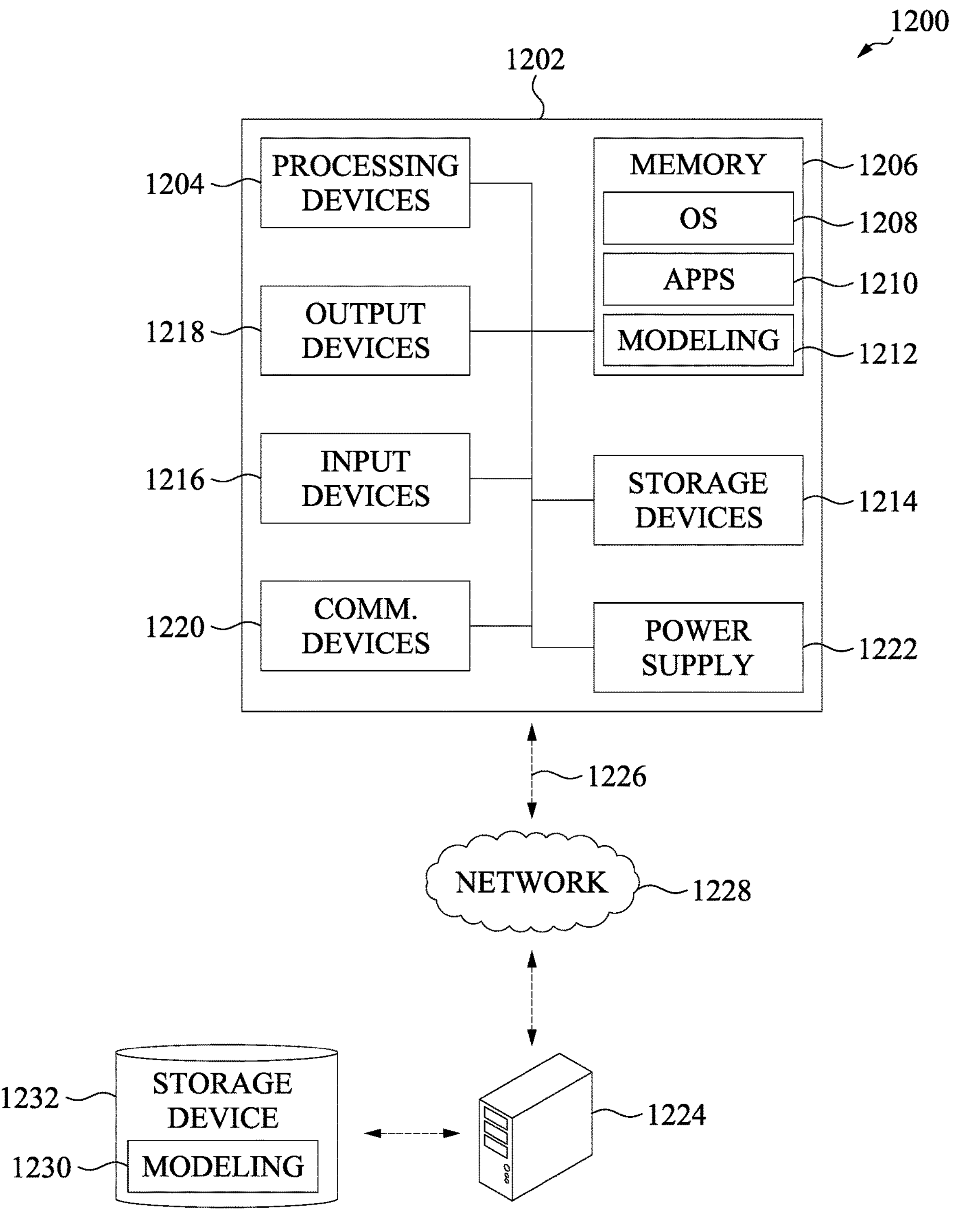
FIG. 12 illustrates an example system that can be used to model conductive paths and capacitors in an interposer in accordance with some embodiments.

FIG. 12 illustrates an example system that can be used to model conductive paths and capacitors in an interposer in accordance with some embodiments. The system 1200 includes an electronic device 1202. In a basic configuration, the electronic device 1202 may include at least one processing device 1204 and a system memory 1206. Depending on the configuration and type of the electronic device 1202, the system memory 1206 may comprise, but is not limited to, volatile storage (e.g., random access memory), non-volatile storage (e.g., read-only memory), flash memory, or any combination of such memories. The system memory 1206 may include a number of data files and processor or computer-executable instructions of program modules, such as processor or computer-executable instructions associated with an operating system (OS) 1208, one or more software programs (APPS) 1210 suitable for parsing received input, determining subject matter of received input, determining actions associated with the input and so on, and a modeling program 1212 suitable for modeling various conductive paths and capacitances of an interposer. When executed by the processing device(s) 1204, the processor or computer-executable instructions may perform and/or cause to be performed processes including, but not limited to, the aspects as described herein. For example, the modeling program 1212 can include computer-executable instructions that when executed by the processing device(s), perform some or all of the operations shown in FIG. 11.

The OS 1208, for example, may be suitable for controlling the operation of the electronic device 1202. Furthermore, embodiments may be practiced in conjunction with a graphics library, other operating systems, or any other application program and is not limited to any particular application or system.

The electronic device 1202 may have additional features or functionality. For example, the electronic device 1202 may also include additional removable and/or non-removable data storage devices 1214 such as, for example, magnetic disks, optical disks, tape, and/or memory cards or sticks.

The electronic device 1202 may also have one or more input devices 1216 and one or more output devices 1218. Example input devices 1216 include, but are not limited to, a keyboard, a trackpad, a mouse, a pen, a sound or voice input device, and/or a touch, force and/or swipe input device. The output device(s) 1218 can be one or more displays, one or more speakers, a printer, headphones, haptic or tactile feedback device, and the like. The electronic device 1202 may include one or more communication devices 1220 allowing communications with other electronic devices. Examples communication devices 1220 include, but are not limited to, radio frequency (RF) transmitter, receiver, and/or transceiver circuitry (e.g., WiFi), universal serial bus (USB), parallel and/or serial ports, cellular devices, near field communication devices, and short range wireless devices.

The electronic device 1202 further includes a power supply 1222, which may be implemented as an external power source, such as an AC adapter. Additionally or alternatively, the power supply 1222 may include one or more batteries or a powered docking cradle that supplements or recharges the batteries.

The system memory 1206 and the storage device(s) 1214 may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the electronic device 1202. Any such memory or storage device may be part of the electronic device 1202 or electrically connected to the electronic device 1202.

Furthermore, embodiments may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 12 may be integrated onto a single integrated circuit. Such an SOC device may include one or more processing units, graphics units, communications units, system virtualization units and various application functionality all of which are integrated (or "burned") onto the chip substrate as a single integrated circuit.

When operating via an SOC, the functionality, described herein, with respect to modeling resistances and capacitances, may be operated via application-specific logic integrated with other components of the electronic device 1202 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments may be practiced within a general purpose computer or in any other circuits or systems.

In some embodiments, the electronic device 1202 optionally accesses (optional connection and access indicated by dashed line 1226) one or more server-computing devices (represented by server-computing device 1224) through a wired and/or wireless connection to one or more networks (represented by network 1228). The server-computing device 1224 can interact with a modeling program or service 1230 stored on one or more storage devices (represented by storage device 1232) and executed by the server-computing device 1224. In some embodiments, the modeling program or service 1230 is a cloud-based or Internet-based service. In one implementation, the modeling program or service 1230 can perform some or all of the operations shown in FIG. 11.

The operations performed when modeling the resistances of the conductive paths and/or the capacitors in an interposer can be performed by modeling program 1212, distributed between the modeling program 1212 and the modeling program 1230, or by the modeling program 1230. When the modeling program 1230 performs all of the operations, the modeling program 1212 in the electronic device 1202 may be omitted.

In one or more embodiments, the network 1228 is illustrative of any type of network, for example, an intranet and/or a distributed computing network (e.g., the Internet). The electronic device 1202 can be a personal or handheld computing device or a desktop computing device. For example, the electronic device 1202 may be a smart phone, a tablet, a wearable device, a desktop computer, a laptop computer, and/or a server (individually or in combination). This list of electronic devices is for example purposes only and should not be considered as limiting. Any electronic device that provides and/or interacts with one or more modeling programs or services may be utilized.

As described herein, embodiments provide an interposer that can be used to electrically connect a first integrated circuit to a second integrated circuit in a vertically stacked integrated circuit. Additionally or alternatively, the interposer may be used to connect an integrated circuit to a substrate or printed circuit board. In some instances, a signal that is received by a circuit on an integrated circuit can experience signal loss due at least in part to the resistance associated with the conductive path the signal travels from a power supply to the circuit. To reduce the signal loss, the interposer includes one or more capacitors that provide power to one or more circuits on an integrated circuit. Because the distance from a capacitor in the interposer to a circuit is less than the distance from the power supply to the circuit, the resistance associated with the conductive path between the capacitor in the interposer and the circuit is less. Reducing the resistance of the conductive path can in turn reduce the signal loss of a signal that is received by the circuit.

In some embodiments, one or more capacitors and one or more conductive paths in an interposer can be modeled to estimate or determine the electrical performance or behavior of the capacitor(s) and the conductive path(s). By modeling the electrical performance, the capacitors and/or the conductive paths can be designed and fabricated to provide a given power level (or a given range of power) to an integrated circuit and/or to reduce an amount of signal loss in a signal that is received by a circuit in an integrated circuit. Additionally, a performance value of one or more capacitors can be determined, such as, for example, an output voltage of a capacitor. Additionally or alternatively, at least one characteristic of the capacitor can be determined. For example, a distance between the top and the bottom conductive plates, an area of the top conductive plate, and/or the bottom conductive plate can be determined.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An interposer, comprising:

a first conductive layer comprising a first area comprising a first signal line and a second signal line, wherein both the first signal line and the second signal line are positioned closer to a first surface of the interposer than a second surface of the interposer, the second surface being opposite of the first surface, and wherein a first integrated circuit is stacked on the first surface of the interposer and is connected to the interposer;

a plurality of capacitors comprising a first conductive plate and a second conductive plate, wherein the first conductive plate is positioned closer to the first surface of the interposer than the second surface of the interposer and the second conductive plate is positioned closer to second surface of the interposer than the first surface of the interposer;

a plurality of first connectors, a respective first connector of the plurality of first connectors connecting the first conductive plate of a respective capacitor of the plurality of capacitors to the first signal line in the first conductive layer;

a plurality of second connectors, a respective second connector of the plurality of second connectors connecting the second conductive plate of the respective capacitor of the plurality capacitors to the second signal line in the first conductive layer, wherein:

the plurality of first connectors are arranged to overlap and alternate with the plurality of second connectors along a first dimension of the interposer, wherein the first dimension extends perpendicular to a thickness direction of the interposer;

each of the plurality of first connectors extend out from the first signal line along a second dimension of the interposer towards the second signal line, wherein the second dimension extends perpendicular to the first dimension and the thickness direction;

each of the plurality of second connectors extend out from the second signal line along the second dimension of the interposer towards the first signal line;

the first conductive layer further comprises a second area having a third signal line;

one or more third connectors extend out from the first signal line along a third dimension towards the third signal line; and one or more fourth connectors extend out from the third signal line along the third dimension towards the first signal line.

2. The interposer of claim 1, further comprising:

a second conductive layer comprising a third signal line and a fourth signal line;

one or more third connectors spaced apart from the first and the second conductive plates, a respective third connector of the one or more third connectors connecting the first signal line in the first conductive layer to the third signal line in the second conductive layer; and one or more fourth connectors spaced apart from the first and the second conductive plates, a respective fourth connector of the one or more fourth connectors connecting the second signal line in the first conductive layer to the fourth signal line in the second conductive layer.

3. The interposer of claim 1, wherein a portion of a third dimension of each first connector overlaps a portion of the third dimension of an adjacent second connector.

4. The interposer of claim 1, wherein the second dimension of the interposer is less than the first dimension.

5. The interposer of claim 1, wherein the first conductive plate comprises a capacitor top metal plate, and wherein the second conductive plate comprises a capacitor bottom metal plate.

6. The interposer of claim 1, wherein:

in a first area of the interposer, each of the plurality of first connectors extends out from the first signal line along the second dimension of the interposer towards the second signal line and each of the plurality of second connectors extends out from the second signal line along the second dimension of the interposer towards the first signal line;

in a second area of the interposer, each of the plurality of first connectors extends out from the first signal line along a third dimension of the interposer towards another second signal line and each of the plurality of second connectors extends out from the another second signal line along the third dimension of the interposer; and a portion of a fourth dimension of each of the plurality of first connectors overlaps a portion of the fourth dimension of an adjacent second connector.

7. The interposer of claim 1, wherein each of the plurality of first connectors the plurality of second connectors comprise a set of one or more connectors.

8. The interposer of claim 1, further comprising a via formed in the first conductive plate, wherein the respective second connector is positioned in the via to connect the second conductive plate of the respective capacitor to the second signal line in the first conductive layer.

9. The interposer of claim 1, further comprising a through-silicon via formed in the interposer for routing a signal line.

10. An interposer, comprising:

a first conductive layer comprising a first area comprising a first signal line and a second signal line, wherein both the first signal line and the second signal line are positioned closer to a first surface of the interposer than a second surface of the interposer, the second surface being opposite of the first surface, and wherein a first integrated circuit is stacked on the first surface of the interposer and is connected to the interposer;

a plurality of capacitors positioned comprising a first conductive plate and a second conductive plate parallel to the first conductive plate, wherein the first conductive plate is positioned closer to the first surface of the interposer than the second surface of the interposer and the second conductive plate is positioned closer to second surface of the interposer than the first surface of the interposer;

a plurality of first connectors, a respective first connector of the plurality of first connectors connecting the first conductive plate of a respective capacitor of the plurality of capacitors to the first signal line in the first conductive layer;

a plurality of second connectors, a respective second connector of the plurality of second connectors connecting the second conductive plate of the respective capacitor of the plurality of capacitors to the second signal line in the first conductive layer, and wherein:

the plurality of first connectors are arranged to overlap and alternate with the plurality of second connectors along a first dimension of the interposer, wherein the first dimension extends perpendicular to a thickness direction of the interposer, each of the plurality of first connectors extend out from the first signal line along a second dimension of the interposer towards the second signal line, wherein the second dimension extends perpendicular to the first dimension and the thickness direction, each of the plurality of second connectors extends out from the second signal line along the second dimension of the interposer towards the first signal line;

the first conductive layer further comprises a second area having a third signal line;

one or more third connectors extend out in the second area from the first signal line along a third dimension towards the third signal line; and one or more fourth connectors extend out in the second area from the third signal line along the third dimension towards the first signal line.

11. The interposer of claim 10, wherein each of the plurality of capacitors comprises a metal-insulator-metal capacitor.

12. The interposer of claim 10, further comprising a through-silicon via formed in the interposer for routing a signal line.

13. The interposer of claim 10, further comprising a via formed in the first conductive plate, wherein the respective second connector is positioned in the via to connect the second conductive plate of the respective capacitor to the second signal line in the first conductive layer.

* * * * *